United States Patent [19]

Gonzalez et al.

[11] Patent Number: 5,564,804
[45] Date of Patent: Oct. 15, 1996

[54] DISK DRIVE BRACKET

[75] Inventors: Adolpho Gonzalez; Brian J. Ray, both of San Jose, Calif.

[73] Assignee: Silicon Graphics, Inc., Mountain View, Calif.

[21] Appl. No.: 168,166

[22] Filed: Dec. 17, 1993

[51] Int. Cl.$^6$ .................................................. A47B 81/06
[52] U.S. Cl. ...................................................... 312/223.2
[58] Field of Search ............................... 312/223.2, 265.5, 312/351, 107; 361/730, 731, 732, 685, 686, 727, 729, 735

[56] References Cited

U.S. PATENT DOCUMENTS

| | | | |
|---|---|---|---|
| 5,067,041 | 11/1991 | Cooke et al. | 361/685 |
| 5,277,615 | 1/1994 | Hastings | 361/685 |

*Primary Examiner*—Peter M. Cuomo
*Assistant Examiner*—Gerald A. Anderson
*Attorney, Agent, or Firm*—Sterne, Kessler, Goldstein & Fox P.L.L.C.

[57] ABSTRACT

A bracket for securing a computer drive within a housing. The housing has a housing base, and two housing walls each disposed perpendicularly to the housing base and to each other. The bracket comprises a base for supporting the computer drive. The base has a first base aperture for slidably securing the bracket within the housing and for preventing movement of the bracket in a first degree of freedom. The bracket also comprises a first support means, which is perpendicularly coupled to the base, for engaging the first housing wall and for preventing movement of the bracket in a second degree of freedom. Perpendicularly coupled to the base is a first means for engaging the second housing wall and for preventing movement of the bracket in a third degree of freedom. The bracket further comprises a second support means which is perpendicularly coupled to said base. The second support means has an interior surface facing an interior surface of the first support means. Additionally, the second support means has a flange where the first means are located. The bracket also includes two cover portions. A substantially flat first cover is perpendicularly coupled to the first support means and is substantially parallel to the base. A substantially flat second cover is perpendicularly coupled to the second support and planar with the first cover. The first cover, second cover, first support means, second support means and base enclose the computer drive and secure the computer drive to the housing. The bracket is configured to enable a second bracket to securely mount the bracket. Base tabs from a second bracket slidably enter openings in the covers of the bracket to securely mount the second bracket on the bracket.

18 Claims, 3 Drawing Sheets

DISK DRIVE BRACKET

BACKGROUND OF THE INVENTION

1. Field of the Invention

The present invention relates to a self contained computer disk drive bracket for securing a hard disk drive to a computer housing.

2. Related Art

When designing a computer many factors must be considered. Some technical considerations are: processor speed, bus size, memory requirements, and the physical size of the computer housing. When positioning components within the computer housing it is desirable to position some components such that they are easily removable by and easily assembled by a user or technician. An example of such a component is a hard disk drive.

Disk drive brackets secure disk drives to the computer housing. It is often desirable to design disk drive brackets to permit a user or a technician to easily secure the hard disk drives to the housing and to permit the hard disk drives to be easily removed from the housing. Hard disk drives are usually secured within the disk drive bracket. This bracket is then secured to the housing. Typically, the bracket is secured to the housing via screws or bolts that are inserted through the bracket and into the housing. This method has many disadvantages. When removing the hard disk drive bracket, screws are periodically misplaced. If all of the screws are not used to attach the bracket to the computer housing, the bracket may not be secure. If the disk drive bracket is not secure the disk drive may vibrate excessively. Such vibration may damage the disk drive and components adjacent to the disk drive or may adversely affect data storage and retrieval.

Another disadvantage of using screws or bolts to secure the disk drive bracket to the housing is that when replacing the disk drive, the user or the technician must physically unscrew each screw in order to disengage the disk drive bracket from the housing. Such a process is tedious and time consuming.

Another computer requirement is that the computer housing must be able to support objects placed thereon. Frequently computer monitors or other heavy objects are placed on the housing cover. The computer must be designed to support such objects without having the housing cover buckle under the object's weight. Attempts to solve this problem include using stronger and more rigid material for the housing cover and the housing walls. This technique may solve the problem. However, the cost of this solution includes higher production costs, i.e., for the housing material, and increased system weight. Another solution involves placing supports inside the housing. This solution also entails additional costs and additional system weight. An apparatus for supporting the housing cover without increasing the cost or the weight of the computer system is desirable.

What is needed is a self contained disk drive bracket which enables the user to quickly and efficiently secure the disk drive bracket to the housing and to quickly and efficiently disengage the disk drive bracket from the housing. In addition the disk drive brackets should be capable of supporting the housing cover without increasing the weight of the computer system.

SUMMARY OF THE INVENTION

The present invention is a bracket for securing a computer drive within a housing. The housing has a housing base, and housing walls each disposed perpendicularly to the housing base. The bracket has a base for supporting the computer drive. The base has a base aperture for slidably securing the bracket within the housing and for preventing movement of the bracket in a first degree of freedom.

The bracket also has a first support means, which is perpendicularly coupled to the base, for engaging a first housing wall and for preventing movement of the bracket in a second degree of freedom. Perpendicularly coupled to the base is a first means for engaging a second housing wall and for preventing movement of the bracket in a third degree of freedom. The base aperture, the first support means, and the first engaging means obviate the conventional method for securing a disk drive bracket, e.g., by using screws or bolts. By obviating the need for screws and bolts the present invention saves time and effort when removing or securing the bracket.

The bracket also has a second support means which is perpendicularly coupled to said base. The second support means has an interior surface facing an interior surface of the first support means. Additionally, the second support means has a flange for coupling with another housing wall, where the first means are located. The bracket also includes two cover portions for enclosing a disk drive bracket. A substantially flat first cover is perpendicularly coupled to the first support means and is substantially parallel to the base. A substantially flat second cover is perpendicularly coupled to the second support and planar with the first cover.

Two or more brackets may be stacked on top of each other to support zero or more drives and to provide support for the housing cover. The bracket covers have openings. The bracket stacking is accomplished by having a base tab from a second bracket slidably enter the bracket cover openings of the first bracket to secure the second bracket on top of the first bracket.

The first cover, second cover, first support means, second support means and base enclose the computer drive and secure the computer drive to the housing.

BRIEF DESCRIPTION OF THE FIGURES

The foregoing and other objects, features and advantages of the invention will be apparent from the following more particular description of the preferred embodiments of the invention, as illustrated in the accompanying drawings, wherein.

DETAILED DESCRIPTION OF THE PREFERRED EMBODIMENTS

The preferred embodiment of the invention is now described with reference to the figures where like reference numbers indicate identical or functionally similar elements. Also in the figures, the left most digit of each reference number corresponds to the figure in which the reference number is first used. While specific steps, configurations and arrangements are discussed, it should be understood that this is done for illustrative purposes only. A person skilled in the relevant art will recognize that other steps, configurations and arrangements can be used without departing from the spirit and scope of the invention.

Figure 1:
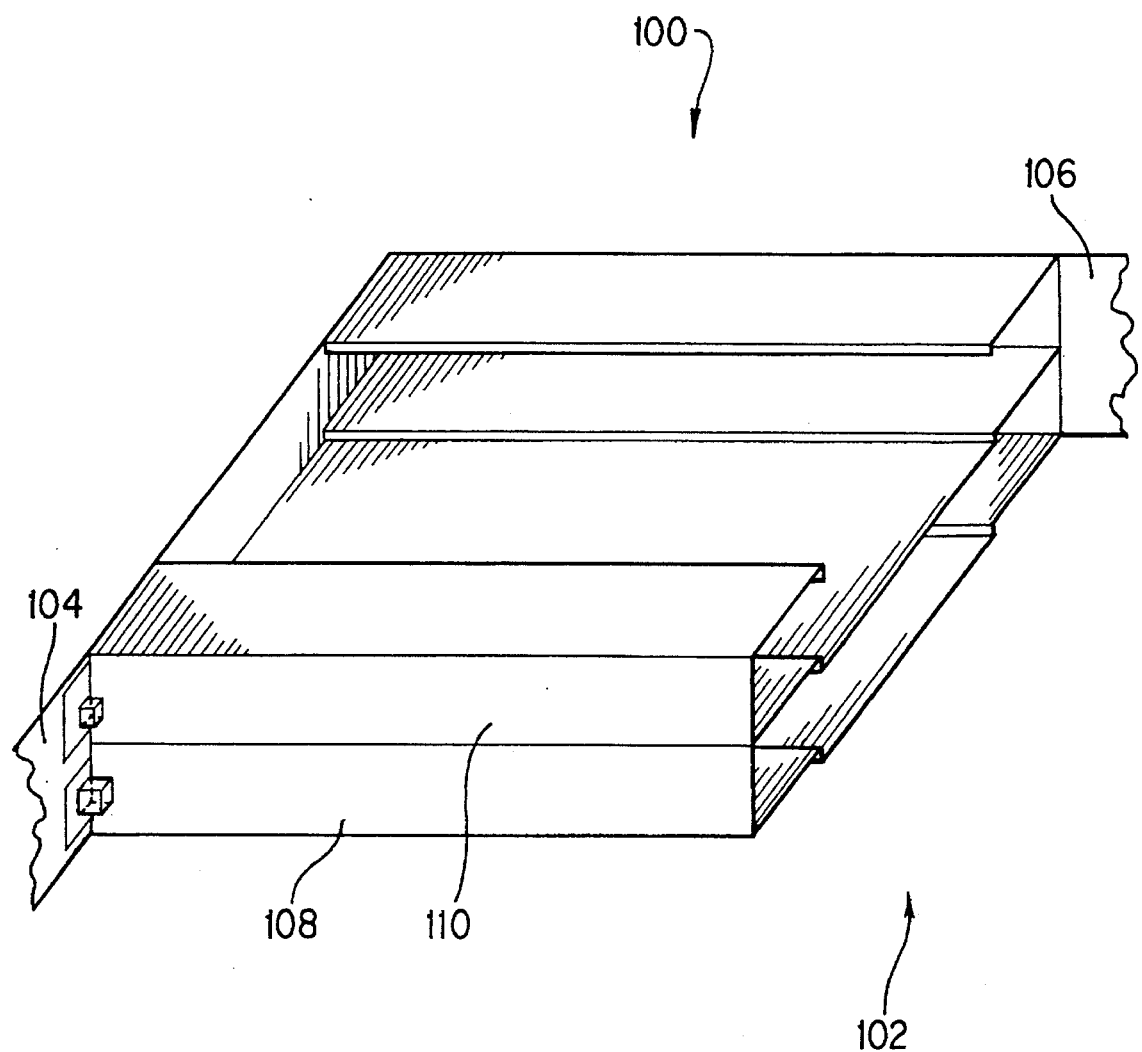
FIG. 1 is an illustration of stacked disk drive brackets in the computer housing according to the present invention.

The preferred embodiment of the present invention is a disk drive bracket (also abbreviated as "bracket") for use in a computer system. Enclosing and protecting the computer system is a computer housing 100. A partial perspective view of a computer housing 100 is shown in FIG. 1. The computer housing 100 has a housing base 102, four housing walls and a housing cover (not shown). Two housing walls 104, 106 are shown in FIG. 1. Within the housing are two disk drive brackets 108, 108'.

Figure 2:
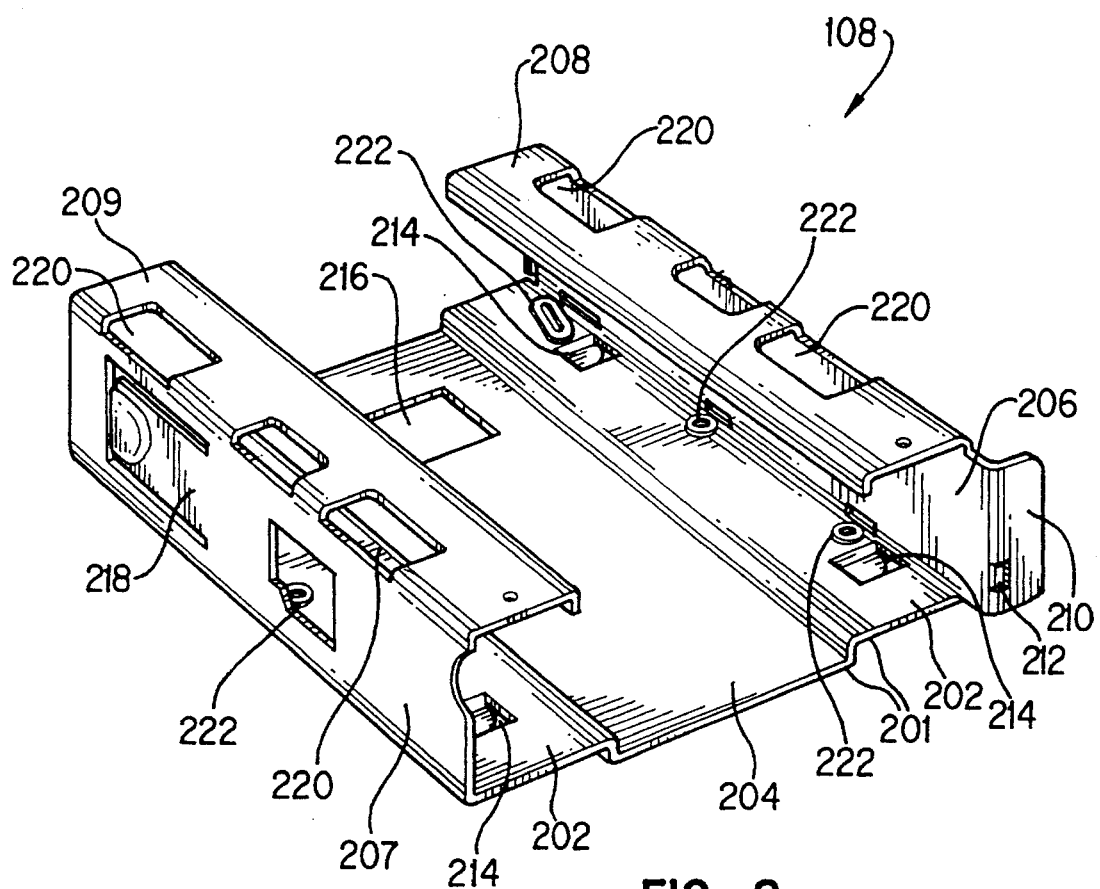
FIG. 2 is a front perspective view illustrating the disk drive bracket of the present invention.

FIG. 2 illustrates a perspective view of one disk drive bracket 108 of the present invention. The second disk drive bracket 108' is identical to the first disk drive bracket 108. Each bracket 108 has a bracket base 201. In the preferred embodiment, the bracket base 201 consists of an outer portion 202 and a recessed portion 204. The recessed portion 204 contacts the housing base 102.

Each outer portion 202 has two base tabs 214 which extend below a plane in which the two outer portions 202 reside. Each base tab 214 is designed such that the second bracket can slidably enter an opening 220 of the first bracket 108. Each base tab 214 of the second bracket 108' slidably enters one opening 220 of the first bracket 108. This is termed "stacking". Stacking the brackets is discussed below.

Figure 4:
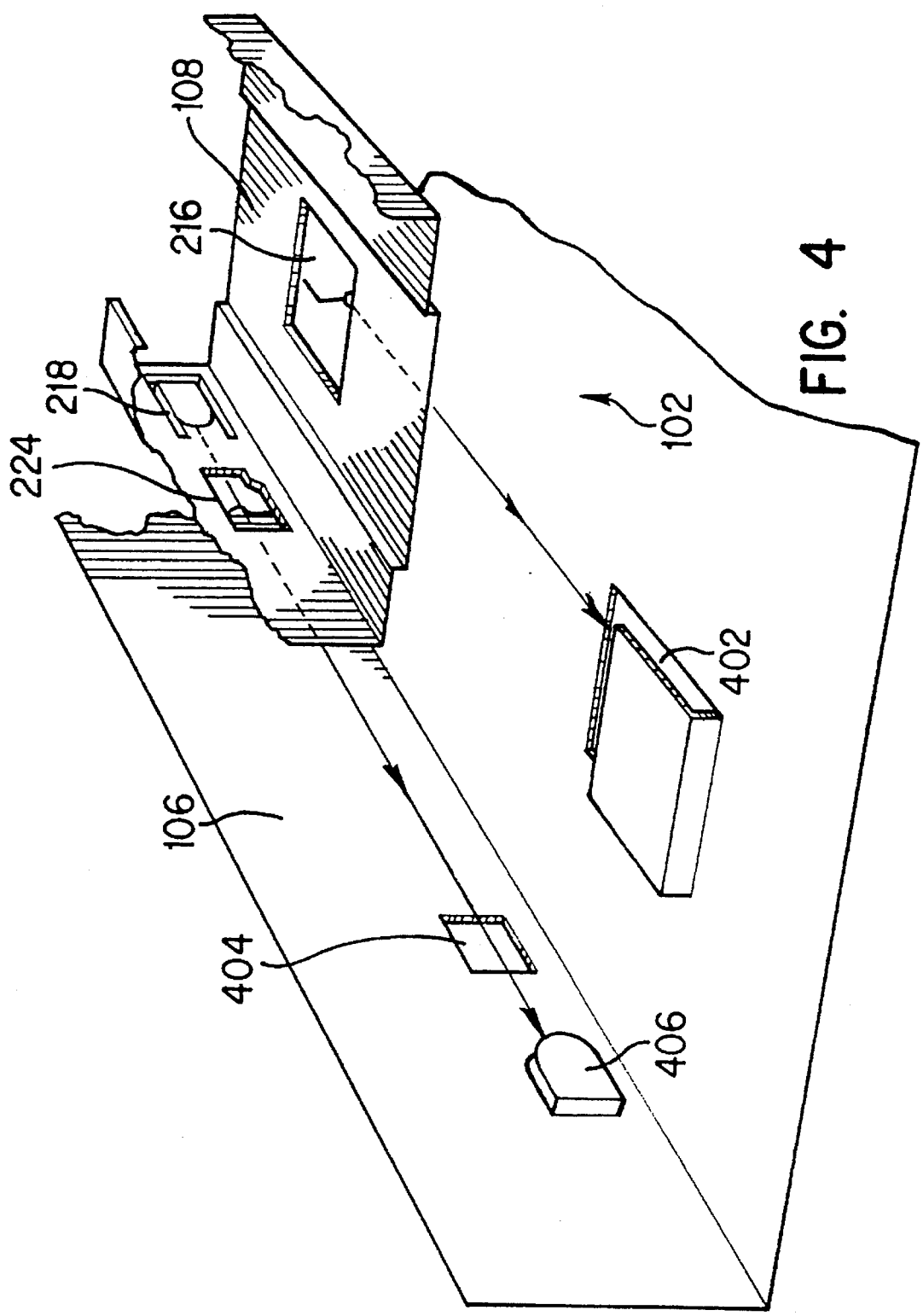
FIG. 4 is an illustration of a cut-away view of the disk drive bracket and the computer housing of the present invention.

FIG. 4 illustrates a cut-away view of the disk drive bracket 108 and the computer housing 100. The recessed portion 204 has a base opening 216. The housing base 102 has a housing tab 402 which fits securely within the base opening 216 thereby preventing the bracket 108 from moving in a first degree of freedom relative to the computer housing 100. When slidably secured to the housing base 102, the bracket 108 cannot move in the direction which is perpendicular to the plane in which the outer portions 202 reside.

The base tabs 214 and the base opening 216 are significant features of the present invention. The present bracket 108 is self contained. That is, no additional parts are necessary to secure the bracket 108 to the housing and/or to a second bracket 108'. This is in sharp contrast to the traditional method whereby screws are utilized. Screws are easily misplaced and more difficult to work with than the base tabs 214 and base opening 216 of the present invention. Mounting a bracket with screws results in additional production costs because of the time required by an assembler to fasten the screws. In addition, it is occasionally necessary to remove the bracket 108, or the disk drive contained within the bracket 108, from the housing. Once a screw mounted bracket is secured to the housing it is more difficult for a technician to remove the bracket, or a disk drive located within the bracket, from the housing.

Referring again to FIG. 2, the recessed portion 204 of the bracket base 201 does not contact a disk drive (not shown) placed within the bracket 108. That is, a gap exists between the disk drive and the recessed portion 204. This gap permits the air contacting the disk drive to circulate. This circulating air reduces the operating temperature of the disk drive by enabling heat to be transferred away from the disk drive.

Figure 3:
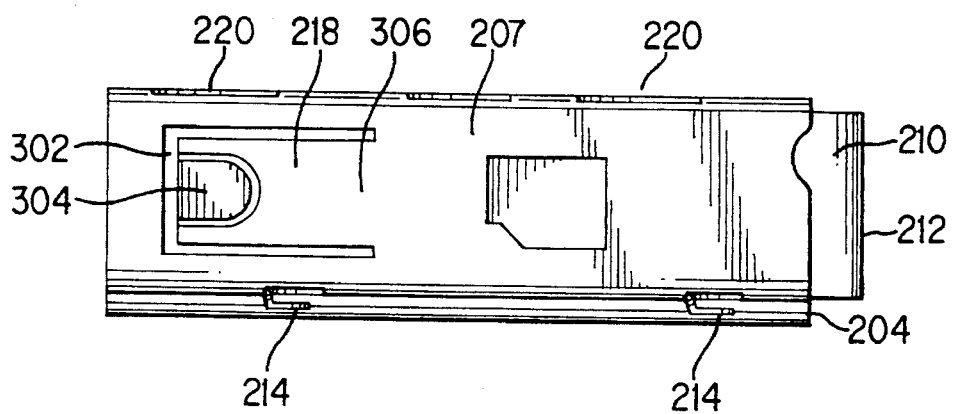
FIG. 3 is a representative side view of the disk drive bracket of the present invention.

In the preferred embodiment, two support walls 206, 207 are each perpendicularly secured to the outer portions 202 of the bracket base 201. When the base opening 216 is slidable secured into the housing base 102, as described above, one support wall 207 is adjacent to a first housing wall 106. Support wall 207 has a wall tab 218 and a wall aperture 224 which is integral with said support wall 207. The wall tab 218 engages a housing wall opening 404 and the wall aperture engages a housing wall tab 406, such that the movement of the bracket 108 is restricted in a second degree of freedom relative to the housing. That is, when the wall tab 218 engages the housing wall 106 and the wall aperture engages a housing wall tab 406, the bracket 108 cannot move in the direction parallel to the support wall 207. FIG. 3, discussed below, illustrates the preferred embodiment of this tab in greater detail.

Support wall 206 also has a flange 210 at one end. When the base opening 216 is slidably secured to the housing base 102, as described above, the flange 210 is adjacent to a second housing wall 104. The flange 210 has an opening 212 for receiving an extension which protrudes from the second housing wall 104. In the preferred embodiment, the extension is a thin piece of metal. When receiving the extension, the flange opening 212 prevents the bracket 108 from moving in a third degree of freedom relative to the housing. That is, when the flange opening 212 receives the housing wall extension (not shown) the bracket 108 cannot move in the direction which is parallel to the plane defined by the flange 210.

In an alternate embodiment of the present invention the second housing wall 104 has an opening and the flange 210 has an extension which enters the housing wall opening to prevent the bracket 108 from moving in a third degree of freedom relative to the housing.

The bracket 108 has two covers 208, 209. Each cover 208, 209 is perpendicularly coupled to one of said support walls 206, 207. Each cover 208, 209 is parallel to and extends over a substantial portion of the outer portions 202. In the preferred embodiment, the covers 208, 209 do not contact each other. The covers 208, 209 form an opening which permits a recessed portion 204 of the second bracket 108' to fit within. Each cover 208, 209 has one or more openings 220 which are positioned such that the base tabs 214 of the second bracket 108' will slidably fit into the cover openings 220 to permit the second bracket 108' to stackably mount onto the first (bottom) bracket 108. The feature of stacking two brackets 108 is described in detail below.

The disk drive (not shown) fits within a region formed by the bracket base 201, the two support walls 206, 207, and the two covers 208, 209. Holes 222 provide openings for screws, or the like, to secure the disk drive to the bracket 108.

FIG. 3 illustrates a side view of the disk drive bracket. Wall tab 218 is illustrated in more detail in FIG. 3. Wall tab 218 is integral with support wall 207. In the preferred embodiment, the wall tab 218 is manufactured with the same material as support wall 207. The wall tab 218 has two ends. A biasing end 306 and an engaging end 303. The engaging end has a protuberance which extends outside the plane defined by support wall 207. This protuberance is termed an engaging tab 304. A gap 302 exists between the engaging end 303 and the support wall 207. This gap 302 permits the engaging end 303 to pivot around the biasing end 306. When slidably securing the bracket 108, the wall tab 218 slides against the housing wall 106 until the base opening 216 locks into the secure position by slidably surrounding the housing tab 402. When in the secure position, the engaging tab 304 fits into an opening 404 in the housing wall 106. When the wall tab 218 slides against the housing wall 106, the engaging end 303, because of the height of the engaging tab 304, is pushed inward. The biasing end 306 is designed to maintain the engaging end 303 in its original position, i.e., in the plane defined by the support wall 207. Therefore, the biasing end 306 applies pressure against the housing wall 106 while attempting to maintain the wall tab's 218 original position.

When the bracket 108 is positioned properly, i.e., in the secure position, the engaging tab 304 aligns with the opening in the housing and the wall aperture 224 aligns with the housing wall tab 406. The biasing end 306 forces the engaging tab 304 outward to snap the engaging tab 304 into the housing opening 404. A tight fit between the engaging tab 304 and the housing opening 404 ensures that the bracket will not move parallel to the support wall 207. That is, the wall tab 218 prevents the bracket from sliding in the direction opposite from which the bracket 108 was inserted. In order to remove the bracket from the housing two events must simultaneously occur. First, the engaging tab 304 must be pressed inward. Second, while pressing the engaging tab inward the bracket must be pulled back in the direction opposite to which it was inserted. When these two events simultaneously occur the engaging tab 304 disengages from the opening in the housing wall 106 and the bracket 108 can be easily removed.

In the preferred embodiment, the bracket 108 is made of sheet metal having a thickness of approximately 0.036 inches. Such a sheet metal is a cold roll steel (CRS) twenty gauge (20 GA), chemical minimum spangle, chemically treated clear coat, G-30 MILL LTV. Vicking, Mfg. manufactures such a metal sheet. The thickness of the sheet provides the bracket with the necessary strength. The strength is sufficient for supporting the housing cover (not shown) as described below. In addition, the metal provides a grounding mechanism and shielding for electromagnetic inductance (EMI). The bracket could also be composed of plastic or other material, including sheet metal having a different thickness, that provides the required strength for supporting the housing cover (not shown) and monitor when stacking two brackets. The feature of stacking two brackets 108 and 108' is described in detail below. It will be apparent to persons skilled in the relevant art that other materials having different characteristics may be used without departing from the spirit and scope of the invention.

A significant feature of the present invention is that each bracket 108 may be stackably secured to each other. The cover openings 220 are positioned such that the base tabs 214 of the second bracket 108' can slide into the cover openings 220 in order to slidably secure the second bracket 108' to the first bracket 108. The recessed portion 204 of the second bracket 108' fits between the two covers 208, 209 of the first bracket. The support wall 206 of the second bracket 108' is adjacent and planar to the support wall 206 of the first bracket. The support wall 207 of the second bracket 108' is adjacent to and planar to the support wall 207 of the first bracket. Each wall tab 218 engages an opening in the housing wall 106 in the manner describe above.

The stackable brackets serve several important functions. First, each bracket secures a conventional hard drive within the computer housing. Second, the height of the stacked brackets 108 and 108' is equal to the height of the housing walls 104, 106. Therefore, it is important to minimize the thickness of the bracket material to prevent forcing an increase in the height of the computer housing. Third, the stacked brackets provide support for the housing cover (not shown) and objects placed on the housing cover (not shown). Frequently items, such as a computer monitor, are placed upon and must be supported by the housing cover. Support for these items can be accomplished in several ways. The housing cover and the housing walls 104, 106 most can be strong enough and rigid enough to support items placed upon the housing cover. However, a housing cover having these desired properties would add significant cost and weight to the computer system. The present invention provides support for the housing cover by placing the housing cover over the bracket covers 208, 209. The support walls 206, 207 of the stacked brackets partially support the weight of the housing cover and objects placed thereon without adding additional weight and expense to the system.

While the invention has been particularly shown and described with reference to a preferred embodiment thereof, it will be understood by those skilled in the art that various change in form and details may be made therein without departing from the spirit and scope of the invention.

What is claimed is:

1. A bracket for securing a computer drive within a housing, the bracket comprising:

a base for supporting the computer drive, having a first base aperture for securing the bracket within the housing;

a first support means, substantially perpendicularly coupled to said base, for engaging the bracket with the housing, wherein said first support means includes a support tab having a first end for engaging with the housing and a second end contiguous with said first support means for acting as a bias;

a second support means, substantially perpendicularly coupled to said base, having an interior surface facing an interior surface of said first support means;

a flange disposed on one end of said second support means; and an engaging means disposed on said flange for engaging the bracket with the housing, wherein said engaging means includes an opening for receiving an extension on the housing.

2. The bracket of claim 1, further comprising:

a substantially flat first cover substantially perpendicularly coupled to said first support means and substantially parallel to said base; and a substantially flat second cover substantially perpendicularly coupled to said second support means and planar with said first cover, wherein said first cover, said second cover, said first support means, said second support means and said base are configured to enclose the computer drive.

3. The bracket of claim 2, wherein said base is substantially flat and further comprises:

a recessed groove for allowing air circulation between said groove and the computer drive.

4. The bracket of claim 3, wherein said first base aperture is located within said groove.

5. The bracket of claim 2, wherein said base, said first support means, said second support means, said first cover, said second cover and said engaging means are formed from sheet metal.

6. The bracket of claim 2, wherein said first cover and said second cover have openings for stackably mounting a second bracket on the bracket.

7. The bracket of claim 1, further comprising a first base tab for slidably mounting and securing the bracket to a second bracket.

8. A bracket for securing a computer drive within a housing, the bracket comprising:

a base for supporting the computer drive, having a first base aperture for securing the bracket within the housing;

a first support means, substantially perpendicularly coupled to said base, for engaging the bracket with the housing, wherein said first support means includes a support tab having a first end for engaging with the housing and a second end contiguous with said first support means for acting as a bias;

a second support means, substantially perpendicularly coupled to said base, having an interior surface facing an interior surface of said first support means, a flange disposed on one end of said second support means;

an engaging means disposed on said flange for engaging the bracket with the housing;

a substantially flat first cover substantially perpendicularly coupled to said first support means and substantially parallel to said base; and a substantially flat second cover substantially perpendicularly coupled to said second support means and planar with said first cover, wherein said first cover, said second cover, said first support means, said second support means and said base are configured to enclose the computer drive.

9. The computer system of claim 8, further comprising a first base tab for slidably mounting and securing the bracket to a second bracket.

10. The computer system of claim 8, wherein said first cover and said second cover have openings for stackably mounting a second bracket on the bracket.

11. The system of claim 10, wherein said base, said first support means, said second support means, said first cover and said first means are formed from sheet metal.

12. A computer system having a computer drive, the system comprising:

a housing base;

a first and a second housing wall each substantially perpendicularly coupled to said housing base and disposed substantially perpendicularly to each other;

a housing cover substantially perpendicularly coupled to said first and second housing walls;

a housing support means for supporting said housing cover, having a first supporting bracket, coupled to said housing base, and a second supporting bracket stackably mounted to said first supporting bracket, each supporting bracket having:

a base for supporting the computer drive, having a first base aperture for securing the bracket within said housing, a first support means, substantially perpendicularly coupled to said base, for engaging the first housing wall, a second support means, substantially perpendicularly coupled to said base, having an interior surface facing an interior surface of said first support means, and having a flange, engaging means disposed on said flange for engaging the second housing wall, a substantially flat cover substantially perpendicularly coupled to said first support means and substantially parallel to said base, having openings for stackably mounting said first and said second supporting brackets, wherein said cover, said first support means, said second support means and said base enclose the computer drive and support said housing cover.

13. The system of claim 12, wherein said base is substantially flat and further comprises:

a recessed groove for allowing air circulation between said groove and the computer drive.

14. The system of claim 13, wherein said first aperture is located in said groove.

15. The system of claim 12, further comprising a first base tab for slidably mounting and securing said second supporting bracket to said first supporting bracket.

16. The system of claim 12, wherein said first support means includes a support tab for engaging one of the housing walls.

17. The system of claim 10, wherein said support tab is integral with said first support means and includes:

a first end for engaging one of the housing walls; and a second end, contiguous with said first support means, for acting as a bias.

18. The system of claim 11, wherein said first means includes an opening for receiving an extension protruding from the second housing wall.

\* \* \* \* \*